United States Patent
Ruutu et al.

(10) Patent No.: US 6,442,392 B2
(45) Date of Patent: Aug. 27, 2002

(54) METHOD AND ARRANGEMENT FOR LOCATING A MOBILE STATION

(75) Inventors: Ville Ruutu; Timo Rantalainen, both of Helsinki (FI)

(73) Assignee: Nokia Mobile Phones, Espoo (FI)

(*) Notice: Subject to any disclaimer, the term of this patent is extended or adjusted under 35 U.S.C. 154(b) by 0 days.

(21) Appl. No.: 09/185,765

(22) Filed: Nov. 4, 1998

(30) Foreign Application Priority Data

Nov. 6, 1997 (FI) .................................................... 974153

(51) Int. Cl.[7] ................................................ H04Q 7/20
(52) U.S. Cl. ...................... 455/456; 455/450; 455/511
(58) Field of Search ............................... 455/435, 450, 455/452, 511, 456, 457; 342/457

(56) References Cited

U.S. PATENT DOCUMENTS

| | | | |
|---|---|---|---|
| 4,728,959 A | 3/1988 | Maloney et al. | 342/457 |
| 5,799,255 A | 8/1998 | Berg et al. | 455/551 |
| 5,945,948 A * | 8/1999 | Bufford et al. | 342/457 |
| 5,970,413 A * | 10/1999 | Gilhousen | 455/456 |

FOREIGN PATENT DOCUMENTS

| | | |
|---|---|---|
| EP | 0210396 A3 | 2/1987 |
| EP | 0341738 A3 | 11/1989 |
| EP | 0 484 918 | 5/1992 |
| EP | 0631453 A3 | 12/1994 |
| FI | 101445 B | 12/1994 |
| FI | 963833 | 9/1996 |
| FI | 965257 | 12/1996 |
| FI | 973342 | 8/1997 |
| FI | 964869 | 10/1997 |
| WO | WO 92 05672 | 4/1992 |
| WO | WO 96/01531 | 1/1996 |

\* cited by examiner

*Primary Examiner*—Melur Ramakrishnaiah
(74) *Attorney, Agent, or Firm*—Perman & Green, LLP

(57) ABSTRACT

The invention relates to a method for locating a mobile station (5) my means of radio signals between the mobile station (5) and the mobile station network (1a, 2a, 3a, 4a) by forming separate location channels in addition to the communication channels. The location channels are, among others, the location access channel and the location receipt channel. The access channel is used to send a burst, which includes the identification of the mobile station (5), such as the International Mobile Subscriber Identification (IMSI). The location channels can be used in the locating methods based on the angle of arrival, time difference and transition time of the radio transmission, for example.

21 Claims, 9 Drawing Sheets

METHOD AND ARRANGEMENT FOR LOCATING A MOBILE STATION

BACKGROUND OF THE INVENTION

1. Field of the Invention

The invention relates to the method defined in the preamble of claim 1 for locating a mobile station. The invention also relates to a mobile station defined in the preamble of claim 10 for locating a mobile station. In addition, the invention relates to a base station defined in the preamble of claim 13 for locating a mobile station. Furthermore, the invention relates to the arrangement defined in the preamble of claim 16 for locating a mobile station. In addition to that, the invention relates to the location service centre defined in the preamble of claim 19 for locating a mobile station.

2. Description of the Related Art

Methods for determining the position of a mobile station are known previously, which methods are based on transferring radio signals between a mobile station and a mobile station network, and the measurement and signal processing thereof. Usually the mobile station network has a central controlling device, which controls the location process and the receivers participating in it. In these methods, location is usually based on two basic arrangements:

1. The mobile station operates as a receiver, and there are several transmitters in the mobile station network. The smallest number of transmitters depends on the location method. This arrangement is known as the mobile station based setting.
2. The mobile station operates as a transmitter, and there are several receivers in the mobile station network. The smallest number of receivers depends on the location method. This arrangement is known as the network based setting.

One such location method is a method based on the measurement of the angle of arrival (AOA) of the radio transmission, which uses direction finding (DF), in which method the mobile station transmits a radio signal to at least two base stations, which examine the angle of arrival of the signal and transmit the measurement results to the location service centre. Because of the inaccuracy of the AOA measurement, instead of defining an accurate angle, a sector from which the signal comes from is defined in this method. The mobile station is situated at the intersection of the arrival sectors. Two sectors are sufficient for the determination, but if there are more, the measurement becomes more accurate. The locations of the base stations are used as the basis of comparison for locating the mobile station. Another such location method is a method based on the transition time of a radio transmission. In this method, at least three base stations send a radio signal to a mobile station on the basis of the network, and the mobile station examines the observed time difference (OTD) of arrival of the signals, and, based on the mobile station, the mobile station transmits a radio signal to at least three base transceiver stations (BTS), which examine the observed time difference of arrival (TDOA) of the signals. In the location service centre (LSC), the arrival times are used to form at least two hyperbolas, at the intersection of which the mobile station is located. Because of the inaccuracy of the arrival times, the hyperbolas are expanded as wide bands, the intersection of which limits an area and not a certain point. The location of the hyperbolas is determined in relation to the location of the base stations.

A third such locating method is based on the radio transmission delay, which method uses the transition time between the mobile station and the base station. In this method, the mobile station and the base station exchange radio signals, the times of arrival (TOA) of which are examined. The transition time must be determined between the mobile station and at least three base stations. In mobile station systems based on Time Division Multiple Access (TDMA), it is necessary to know the transition time of the radio transmission between the mobile station and the base station in order to avoid the overlapping of the time intervals. On the basis of the transition time, the distance of the mobile station from the base station is determined as a location circle in which the radius corresponds to distance and in which the central point is at the base station. There must be at least three of the location circles. The intersection of these circles is the location of the mobile station. One such TOA location method is the Timing Advance (TA) method, which is planned to be used in the GSM system. In the GSM system, as is known, the to-and-from transmission time between the mobile station and the base station is measured. From this it is possible to calculate the distance between the mobile station and the base station.

There is also a system known as Timing Advance, in which the mobile station is forced to carry out consecutive connection switchings to the neighbouring base stations for determining its location.

Other such location methods are the Satellite-based Global Positioning System (GPS), using the identity of the serving cell and measuring the intensity of the signal received.

The known network-based methods have the drawback that heavy signalling is needed between the base stations and the service centre that carries out the location determination. In this method, the mobile station operates as a transmitter, and the network provides the receivers.

A further problem in the known network-based methods is the required coordination in the network. For example, the location service centre indicates to the receiving base stations which channels they should listen to according to the mobile station to be located, or in accordance with the basic settings of the base station, certain predetermined channels are listened to. The channels are indicated by means of time and frequency information, for example. In addition, the measurement results are transferred in the network, which adds to the load on the network.

Furthermore, some known methods based on transition time, such as TA, have the problem that a two-way connection must be established from the mobile station to many base stations before the location can be determined.

In addition, the known system has the drawback that the location process is slow.

The purpose of the invention is to provide a new method for locating a mobile station and to eliminate the above mentioned drawbacks.

BRIEF SUMMARY OF THE INVENTION

The method according to the invention is characterized in what is set forth in claim 1. The mobile station according to the invention is characterized in what is set forth in claim 10. The base station according to the invention is characterized in what is set forth in claim 13. The arrangement according to the invention is characterized in what is set forth in claim 16. The location service centre according to the invention is characterized in what is set forth in claim 19. Preferred embodiments of the invention are presented in the dependent claims.

The invention relates to a method for determining the location of a mobile station by means of radio signals between the mobile station and the mobile station network. In the manner according to the invention, at least one separate location channel is formed between the mobile station and the network in addition to other channels, to which location channel the radio communications related to the measurement of the location of the mobile station is concentrated. All other radio communication related to the location of the mobile station is also preferably concentrated to this channel. Other channels here mean all the known channels used between the mobile station network and the mobile station, such as the channels for ordinary communications and signalling.

In one application of the method, two location channels are formed, of which the first location channel is used for radio communications from the mobile station to the network and the second for radio communications from the network to the mobile station. These are called the Location Access CHannel (LACH) and the Location Receipt CHannel (LRCH). The location access channel resembles the Random Access CHannel (RACH) in the uplink direction of the GSM system, and the location receipt channel resembles the Access Grant CHannel (AGCH) in the downlink direction. Uplink means communications from the mobile station to the network and downlink means communications from the network to the mobile station. In the location access channel, it is possible to send a location signal from the mobile station to the mobile station network at any time without coordination, because the mobile station knows the frequency and interval used in the location access channel, e.g. in the GSM system, and the base stations constantly monitor the channel for location signals. For example, in the Broadcast Control CHannel (BCCH) of the GSM system, a cell can inform the mobile stations of the location access channel by sending information of the frequency and time interval.

In one embodiment of the method, the measurement of the differences between the times of arrival is carried out from the impulse response.

In one application of the method, the first signal burst contains the identification information of the mobile station.

In another application of the method, the identification information is the International Mobile Subscriber Identification (IMSI).

The invention also relates to a mobile station, which comprises a locating device for determining the location by means of radio signals between the mobile station and the mobile station network. According to the invention, the locating device comprises a processor for carrying out the locating routines, memory for saving the locating routines and the measurement results, and a transmitter for transmitting the first signal burst.

In one embodiment of the mobile station, the locating device also comprises a receiver for receiving the acknowledgement signal.

In one embodiment of the mobile station, the receiver is used for receiving the second signal burst, and the locating device also comprises a clock for determining the time of arrival of the burst, and the locating routines include at least determining the time difference between the bursts. Here signal bursts mean bursts received from different base stations.

The invention also relates to a base station for locating the mobile station by radio signals between the mobile station and the mobile station network. According to the invention, it comprises a processor for carrying out the locating routines, a memory for saving the locating routines and the measurement results, a clock for determining the time of arrival of the first burst, an antenna for transforming the first burst into an electric signal, and a receiver for receiving the first burst from the antenna.

In one embodiment of the base station, it also includes a transmitter and an antenna for transmitting a second burst, and the locating routines include at least the determination of the time of arrival of the burst.

In another embodiment of the base station, the antenna is a direction finding antenna for determining the direction of arrival of the first signal burst, and the locating routines include at least the direction finding of the signal bursts.

The invention also relates to an arrangement for locating a mobile station by means of radio signals between the mobile station and the mobile station network. According to the invention, the arrangement consists of a mobile station, which comprises a processor for carrying out the locating routines, a memory for saving the locating routines and measurement results, and a transmitter for transmitting the first signal burst;

and of at least two or three base stations depending on the locating method, which comprise a processor for carrying out the locating routines, a memory for saving the locating routines and measurement results, a clock for determining the time of arrival of the first signal burst, an antenna for transforming the first signal burst into an electric signal, a receiver for receiving the first signal burst from the antenna.

In one application of the arrangement, the mobile station also comprises a receiver for receiving the acknowledgement signal.

In another application of the arrangement, the receiver of the mobile station is used for receiving a second signal burst, and the mobile station also comprises a clock for determining the time of arrival of the second signal burst, and the locating routines of the processor of the mobile station include at least the determination of the time difference between the bursts, and the base stations also comprise a transmitter and an antenna for transmitting a second signal burst.

The invention also relates to a location service centre for locating the mobile station by means of radio signals between the mobile station and the mobile station network. In practice, the Location Service Center (LSC) is only a computer which performs the calculation routines, maintains data bases, such as base station coordinates, starts the location determination and gives location information to the applications. According to the invention it comprises a processor for carrying out the locating routines, which include at least determining the location of the mobile station on the basis of burst measurement results received from the base stations, a memory for saving the locating routines and measurement results, a receiver for receiving measurement results in the signalling channel from base stations, and a transmitter for transmitting commands in the signalling channel to the base stations.

The invention has the advantage that by means of a separate location channel, the need for signalling in the network between the location service centre and the base stations is reduced. The first signal burst of the location access channel sent by the mobile station is a kind of command, to which the receivers of the base stations of the mobile station network can react for measuring the necessary location information, for transmitting the measurement results to the location service centre and for sending a possible acknowledgement to the mobile station.

Two location channels provide the advantage of bi-directional interaction during the location process. With only one location channel available, it is only possible to transmit the first signal burst from the mobile station to the network with predetermined repetition for locating the mobile station.

A further advantage of the invention is the fact that with a separate location channel, it is possible to transmit long signal bursts, which contain the mobile station identification.

In addition, the invention has the advantage that when an emergency call begins, locating can be carried out quickly and automatically.

BRIEF DESCRIPTION OF THE DRAWINGS

In the following, the invention will be described in more detail with reference to the accompanying drawing, in which.

DETAILED DESCRIPTION OF THE INVENTION

Figure 1A:
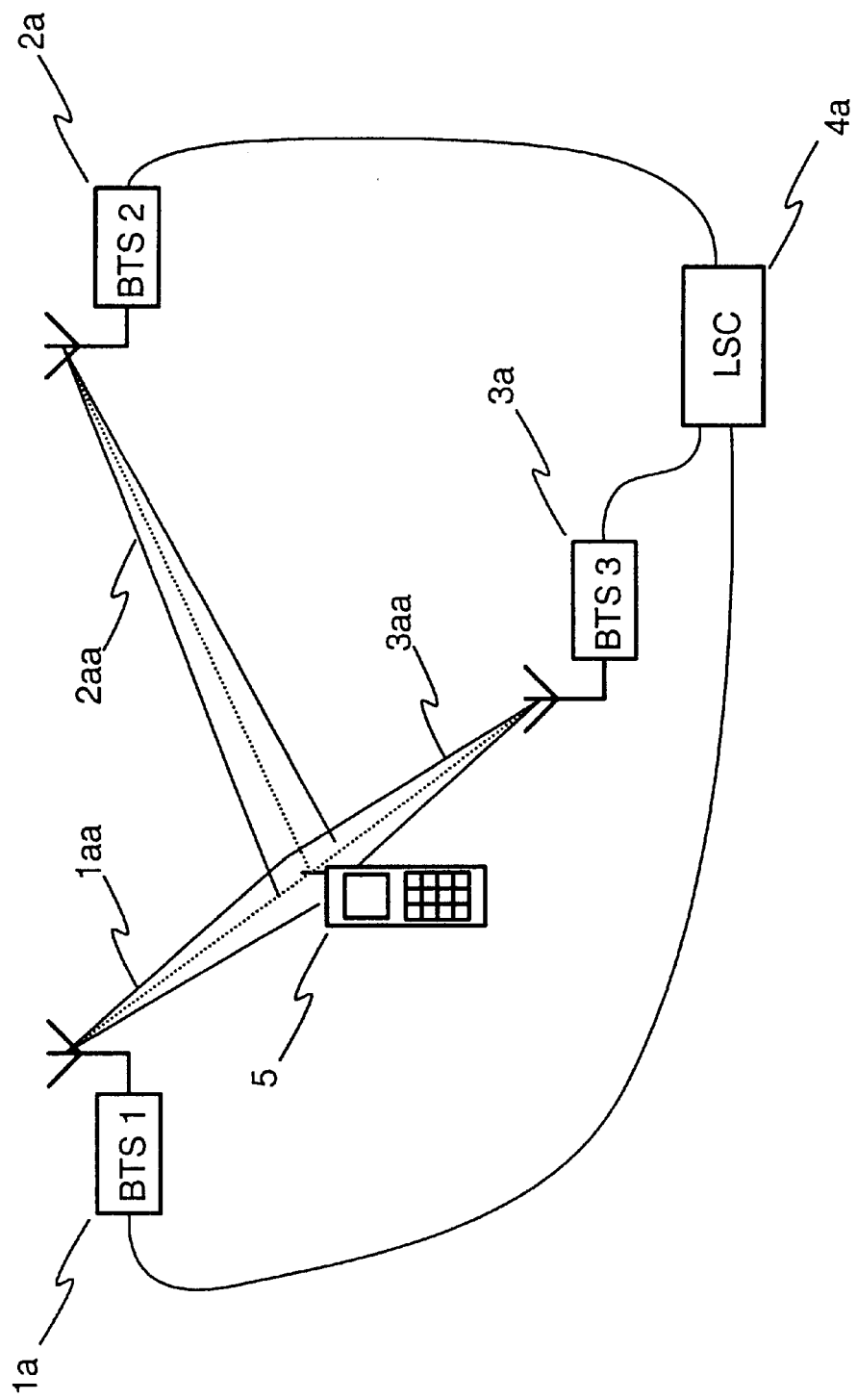
FIG. 1 shows the components of an arrangement according to the invention.

FIG. 1a shows some components of the arrangement according to the invention that are essential for the invention in the locating method based on the angle of arrival of the radio transmission. The mobile station 5 is situated in the service area of the base stations 1a, 2a, 3a. The base stations 1a, 2a, 3a have been switched in the mobile station network to the location service centre 4a. The mobile station 5 and the base stations 1a, 2a, 3a preferably exchange signal bursts for locating the mobile station. The base stations 1a, 2a, 3a include direction finding antennas, by which the first signal bursts sent by the mobile station 5 are determined as coming from the directions 1aa, 2aa, 3aa. Due to the inaccuracy of the determination, the directions 1aa, 2aa, 3aa are narrow sectors at the intersection of which the mobile station 5 is situated. The location service centre 4a has the suitable calculation routines for this locating method and information of the locations of the base stations 1a, 2a, 3a.

Figure 1B:
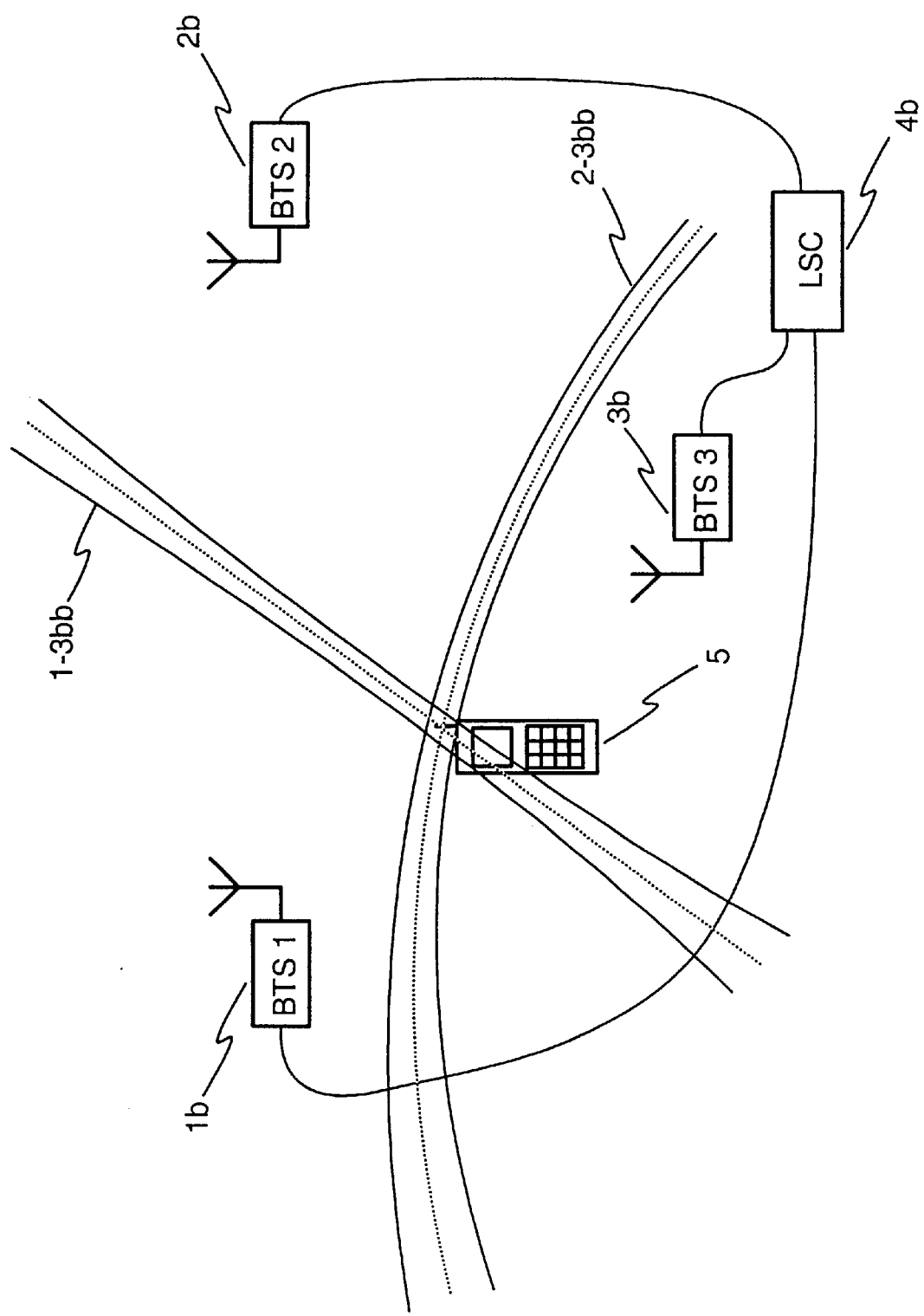

FIG. 1b shows components of the arrangement according to the invention which are essential for the invention in the locating method based on the time difference of arrival of the radio transmission. The mobile station 5 is situated in the service area of the base stations 1b, 2b, 3b. The base stations 1b, 2b, 3b are connected to the location determination service centre 4b in the mobile station network. The mobile station 5 and the base stations 1b, 2b, 3b preferably exchange signal bursts for the location. The base stations 1b, 2b, 3b comprise normal reception antennas by which the first signal bursts sent by the mobile station 5 are received. From the observed time differences between the first signal bursts received by the base stations 1b, 3b from the mobile station 5, a hyperbola 1–3bb is defined, which hyperbola passes through the mobile station 5 and between the base stations 1b, 3b. From the observed time differences between the first signal bursts received by the base stations 2b, 3b from the mobile station 5, a hyperbola 2–3bb is defined, which hyperbola passes through the mobile station 5 and between the base stations 2b, 3b. Due to the inaccuracy of the determination, the hyperbolas 1–3bb, 2–3bb are strip-like curves at the intersection of which the mobile station 5 is situated. The location service centre 4b has the suitable calculation routines for this locating method and information of the locations of the base stations 1b, 2b, 3b.

Figure 1C:
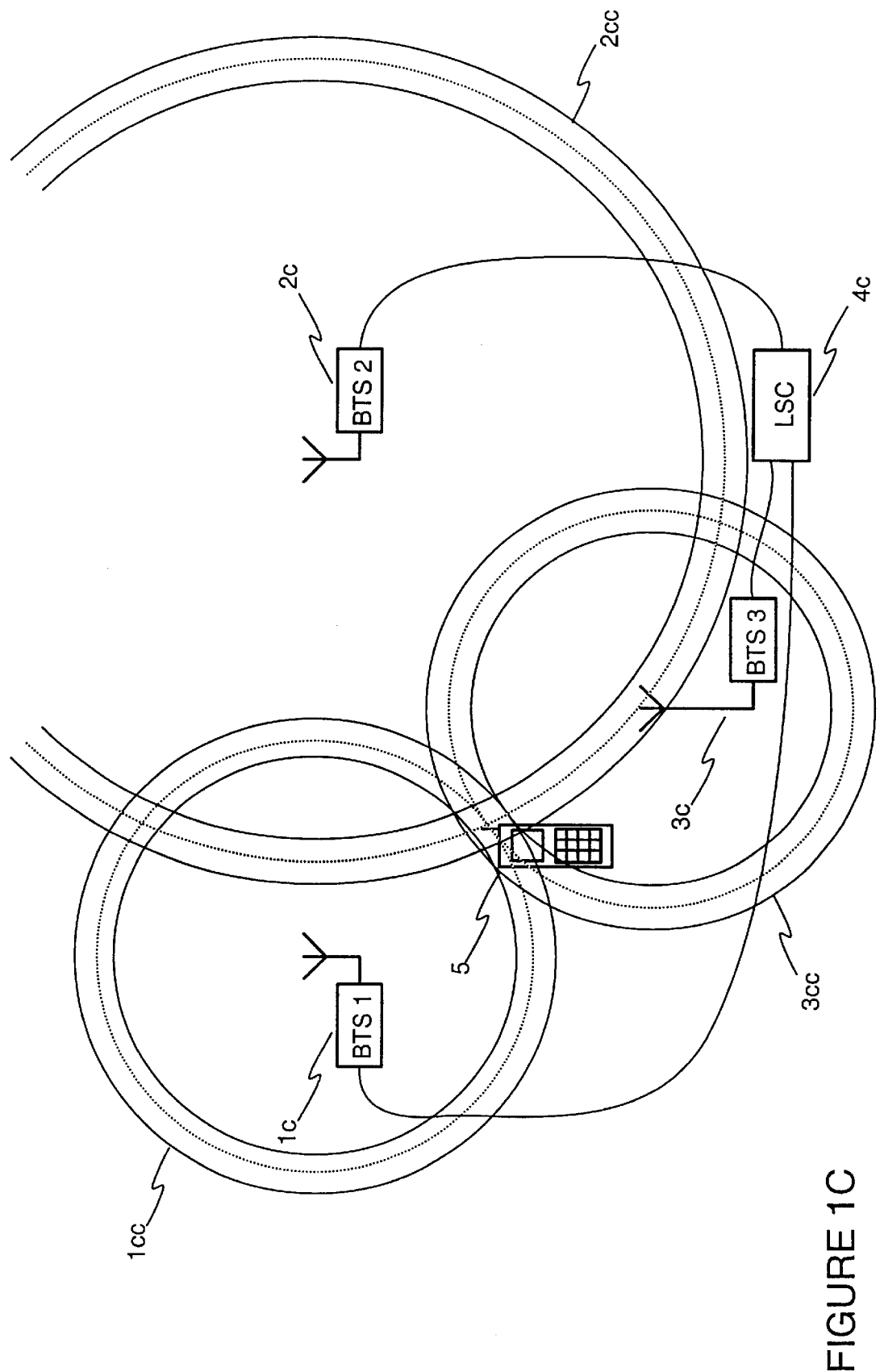

FIG. 1c shows components of the arrangement according to the invention which are essential for the invention in the locating method based on the times of arrival of the radio transmission. The mobile station 5 is situated in the service area of the base stations 1c, 2c, 3c. The base stations 1c, 2c, 3c have been connected to the location service centre 4c in the mobile station network. The mobile station 5 and the base stations 1c, 2c, 3c preferably exchange signal bursts for the location. The base stations 1c, 2c, 3c include normal reception antennas by which the first signal bursts sent by the mobile station 5 are received. From the observed times of arrival of the first signal bursts received by the base stations 1c, 2c, 3c from the mobile station 5, the radii of the circles 1cc, 2cc, 3cc are defined. The mobile station 5 is situated at the intersection of these circles 1cc, 2cc, 3cc. Due to the inaccuracy of the determination of the times of arrival, the circles 1cc, 2cc, 3cc are widened at their circumferences. The mobile station 5 is situated at the intersection of these circles. The location service centre 4c has the suitable calculation routines for this locating method and information of the location of the base stations 1c, 2c, 3c.

In the GSM system, e.g., the locating based on the times of arrival of the radio transmission as described above can be performed by using the Timing Advance measurement. In this measurement, the mobile station times its transmission separately to correspond to the timing of each neighbouring base station. Thus the mobile station listens to the bursts of the base station in question and adjusts the timing of the transmission accordingly. The first bursts sent by the mobile station are received at the base station in question, and their timing is late twice as much as the propagation delay. The distance between the mobile station and the base station can be defined from this. The mobile station examines different neighbouring base stations in turn, or at least the serving base station and two neighbouring base stations.

Figure 2A:
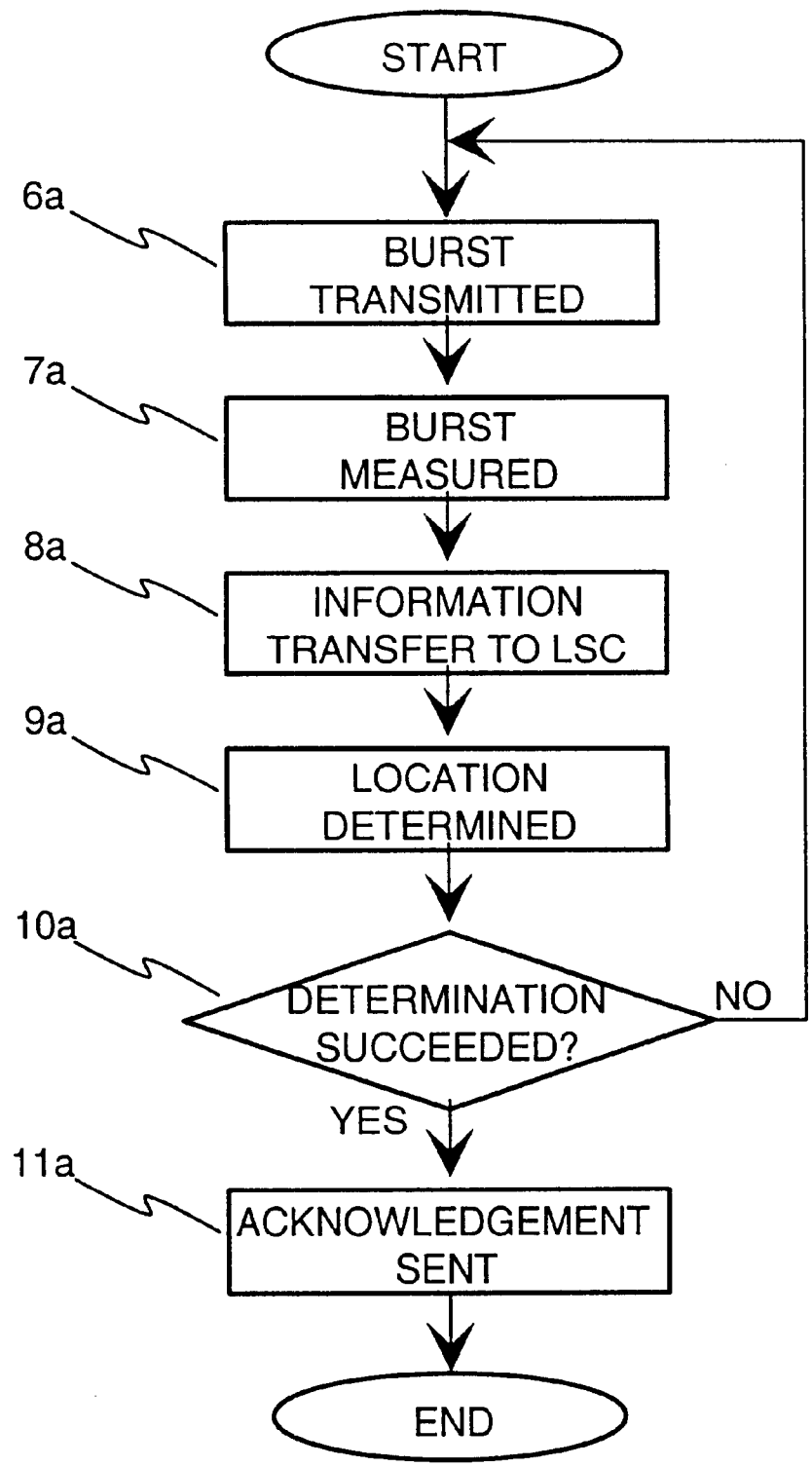
FIG. 2 shows the essential steps of the mobile station locating method in a flow chart.

FIG. 2a shows the essential steps of operation of the mobile station locating method according to the invention as a flow chart. At first, the first signal burst 6a is sent from the mobile station in the location access channel to the receiver of the base station of the mobile station network. The next step, 7a, is to measure at the base station from the first signal burst the information needed in the locating method in use and to receive the identification of the mobile station. According to different locating methods (cf. FIGS. 1a, 1b, 1c), either the angle of arrival or time of arrival of the first signal burst is measured. In the next step 8a, this information is transferred to the location service centre, in which the mobile station is located, 9a, using that information. If the locating 9a did not succeed, 10a, the process returns to the beginning to wait for the next first signal burst 6a from the mobile station. When the location 9a has succeeded, 10a, the next step 11a is to send from the base station to the mobile station a second acknowledgement burst in the location receipt channel and to end the process.

Figure 2B:
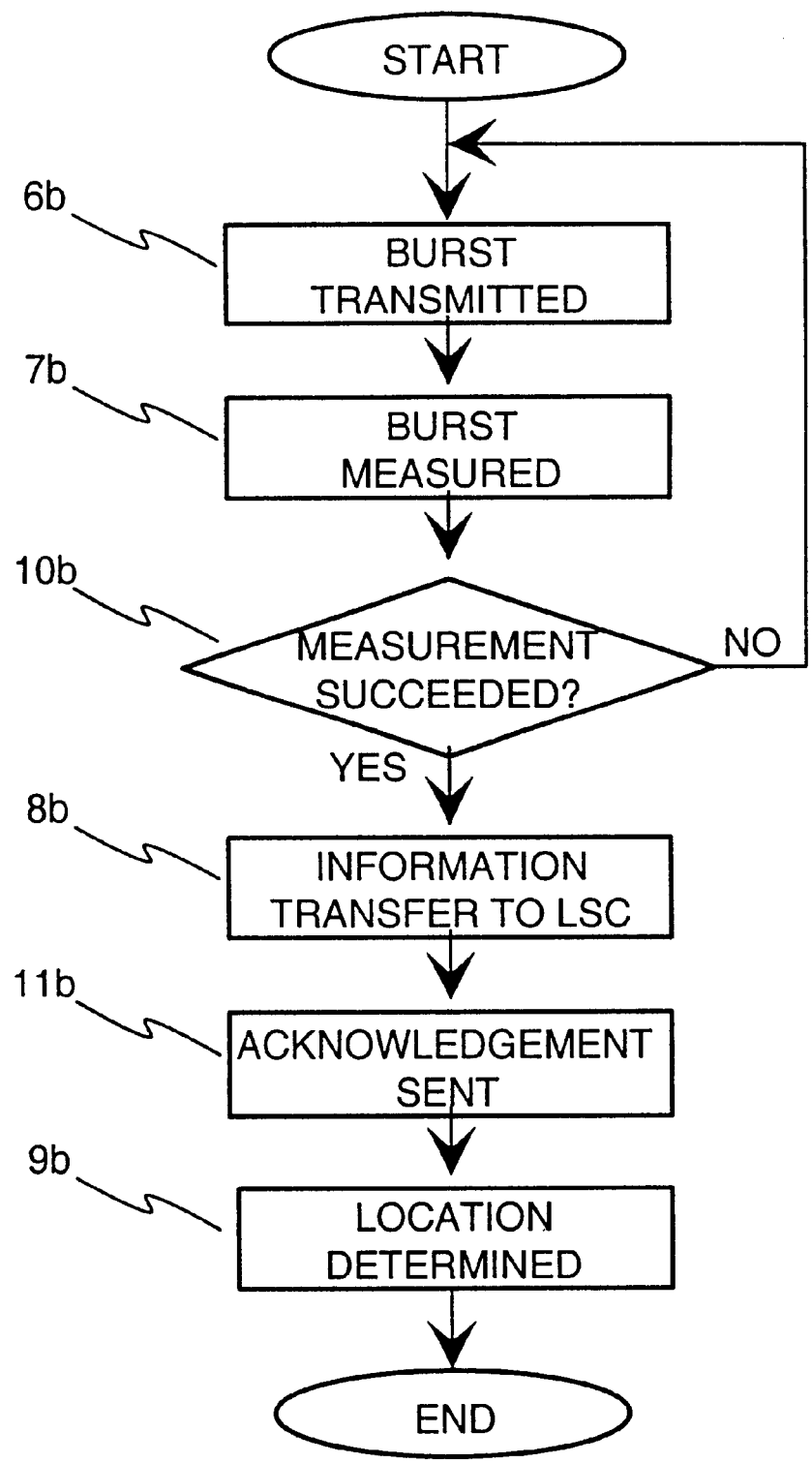

FIG. 2b shows the essential steps of operation of an alternative mobile station locating method in a flow chart. In the first step 6b, a first signal burst is sent from the mobile station in the location access channel to the receiver of the base station of the mobile station network. In the next step 7b, information according to the locating method in use is measured from the first signal burst in the base station and the mobile station identification is received. According to different locating methods (cf. FIGS. 1a, 1b, 1c), either the angle of arrival or the time of arrival of the first signal burst is measured. If the measurement of the signal burst at step 7b did not succeed, 10b, the process returns to the beginning to wait for the next first signal burst 6b from the mobile station. When the measurement of the signal burst 7b has succeeded, 10b, the measurement results are transferred at step 8b to the location service centre, and a second acknowledgement burst is sent at step 11b from the base station to the mobile station in the location receipt channel, and the mobile station is located, 9b.

Figure 3:
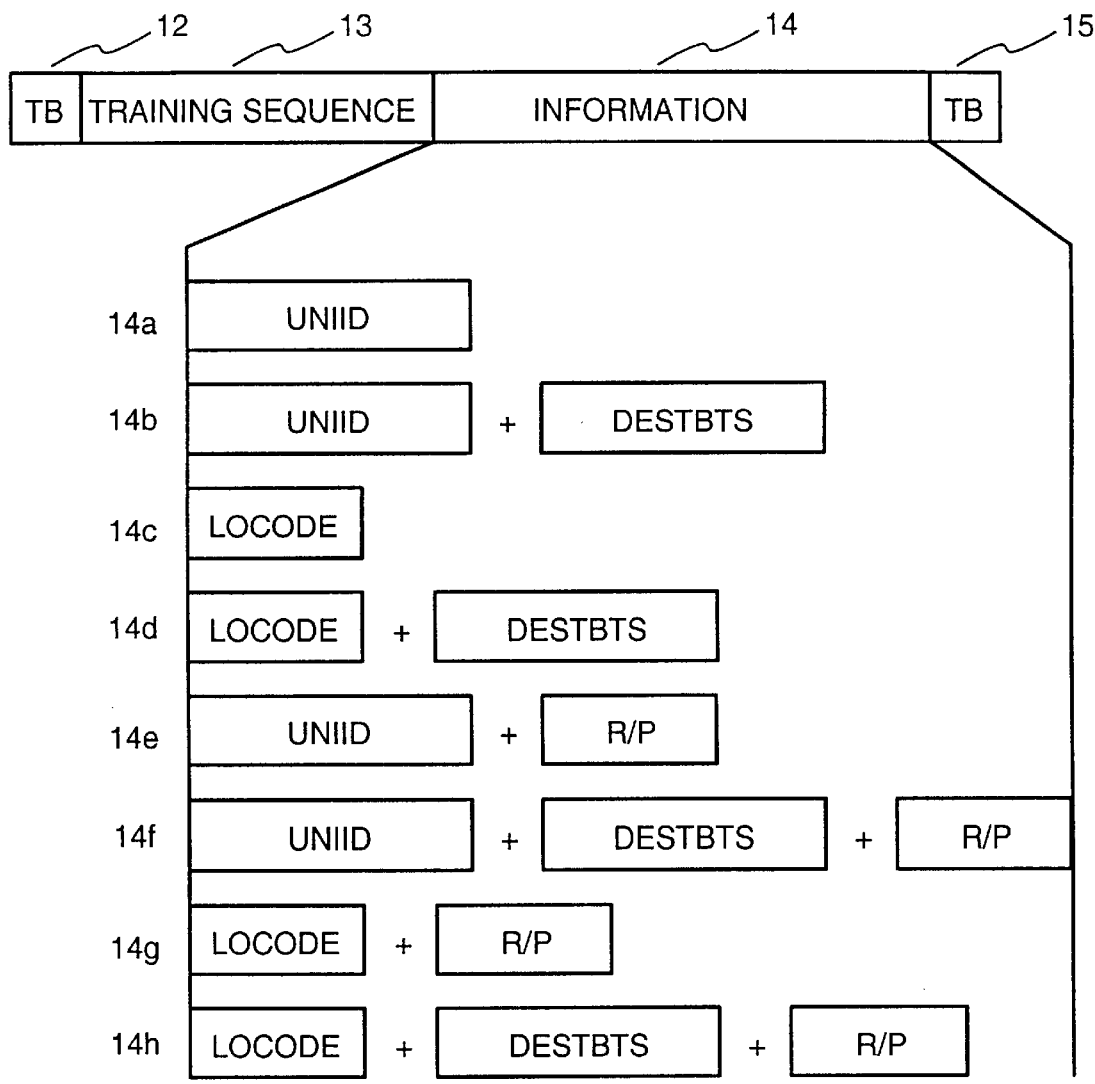
FIG. 3 shows the alternative contents of the first signal burst of a location access channel.

FIG. 3 shows the alternative contents of the first signal burst of a location access channel. The first signal burst of the location access channel is sent from the mobile station to the mobile station network. The first signal burst starts at 12 and ends at 15 with tail bits (TB). After the first tail bits 12, there follows a training sequence 13, followed by an information part 14. As is known, the training sequence 13 contains a series of bits, which can be identified in the reception as the training sequence. The information part 14 contains alternatively one of the following identifications:

- a unique mobile station identification 14a, such as the International Mobile Subscriber Identification (IMSI) or a Temporary Mobile Subscriber Identification (TMSI),
- a unique mobile station identification and the target base station identification, such as the Cell Identity (CI) or the channel number and the Base Station Identity Code (BSIC) 14b,
- a temporary mobile station identification 14c,
- a temporary mobile station identification and the target base station identification 14d,
- a unique mobile station identification and the cause and/or priority 14e of the location request,
- a unique mobile station identification and the target base station identification and the cause and/or priority 14f of the location determination request,
- a temporary mobile station identification and the cause and/or priority 14g of the location determination request, and
- a temporary mobile station identification and the target base station identification and the cause and/or priority 14h of the location determination request.

Figure 4:
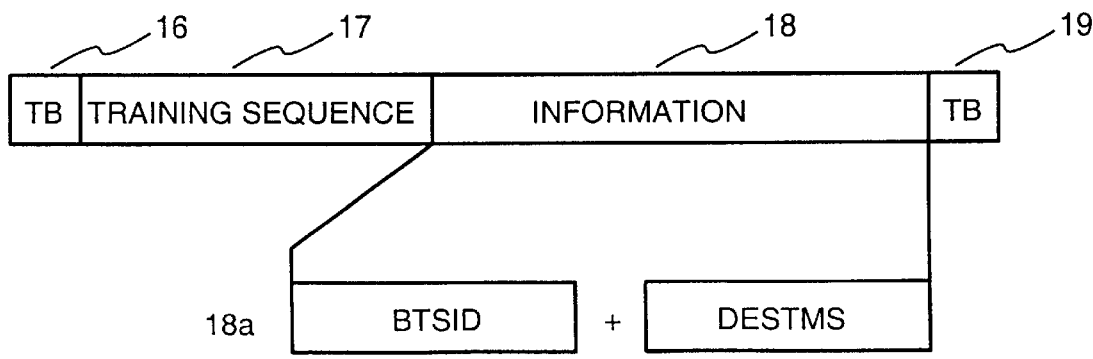
FIG. 4 shows the contents of the second signal burst of a location receipt channel.

FIG. 4 shows the contents of the second signal burst of a location determination receipt channel. The second signal burst of the receipt channel is sent from the mobile station network to the mobile station. The second signal burst starts 16 and ends 19 with Tail Bits (TB). The first tail bits 16 are followed by a Training sequence 17, followed by an information sequence 18. The information sequence 18 contains the identification of the transmitting base station and the identification of the target mobile station 18a. The base station identification consists, e.g., of the cell identification or channel number and the base station identification code. The identification of the target mobile station is determined by how the mobile station has been identified in the access channel.

Figure 5:
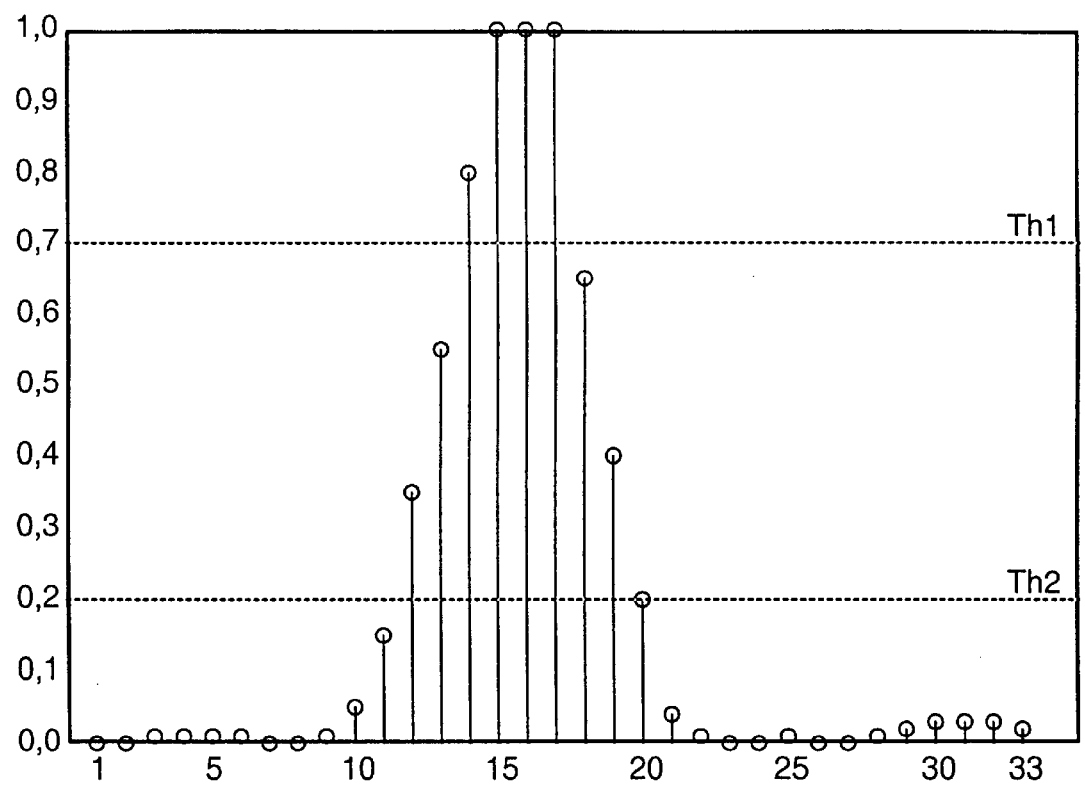
FIG. 5 shows an impulse response in coordinates.

FIG. 5 shows an impulse response of the signal burst in coordinates. The impulse response is determined either by the mobile station or the base station. The time difference between the signal burst to be transferred in the location channel and the reference, such as the training sequence of the signal burst, is determined from the impulse response. These training sequences are identical. When the time difference has been estimated correctly, the training sequences correlate well in the impulse response. The horizontal axis of the figure represents time and the vertical axis represents the normalized correlation, which receives values from 0.0 to 1.0. The response columns 1–9 and 22–33 show ignorably little correlation to the training sequence, from which it is concluded that the time difference is not in an area that corresponds to these columns. The response columns 10–21 show an observable correlation to the training sequence, from which it is concluded that the time difference is in an area that corresponds to these columns. The response columns 15–17 show a full or nearly full correlation. Thus the time difference is about 15– 17 time units, such as samples or bits. A dashed line in the coordinates represents the Th1 threshold level, which the highest response column must preferably exceed to be acceptable. A dashed line is also drawn in the coordinates to represent the Th2 threshold level, below which the surrounding response columns must preferably be so that the highest response column would be acceptable.

Figure 6:
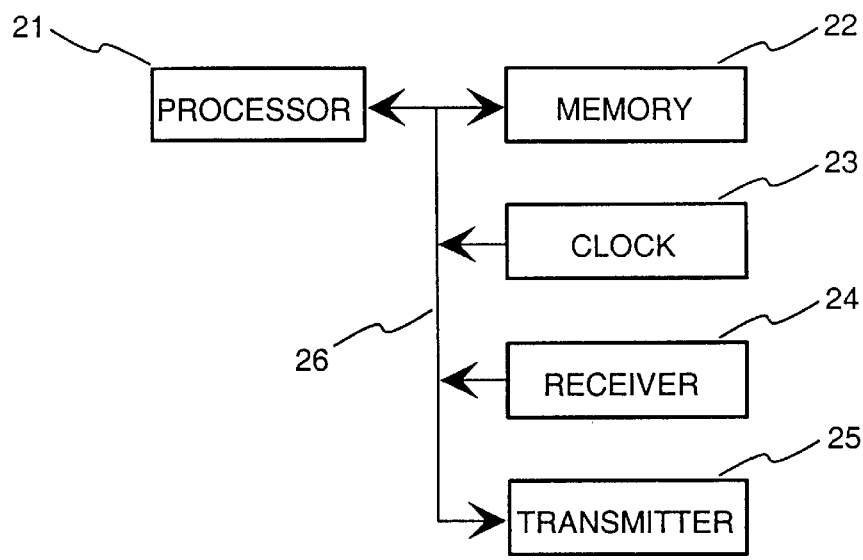
FIG. 6 shows the components of a mobile station according to the invention in a block diagram.

FIG. 6 shows components of a mobile station according to the invention which are essential for the invention in a block diagram. The mobile station comprises a processor 21 for performing the locating routines. The locating routines include at least the reception of second signal bursts sent from the base station to the mobile station and a possible registration or determination of timing advance on the basis of the correlation of the training sequences. The mobile station also comprises a memory 22 for saving the locating routines, such as the calculation formulas of the impulse response and the measurement results, such as the values of the impulse responses. In order to find out the exact timing of second signal bursts, the mobile station also comprises a clock 23 and a receiver 24 for receiving the second signal bursts.

In addition, a transmitter 25 is used for sending the first signal bursts from the mobile station to the base station. The different units of the mobile station are connected through the connection bus 26.

Figure 7:
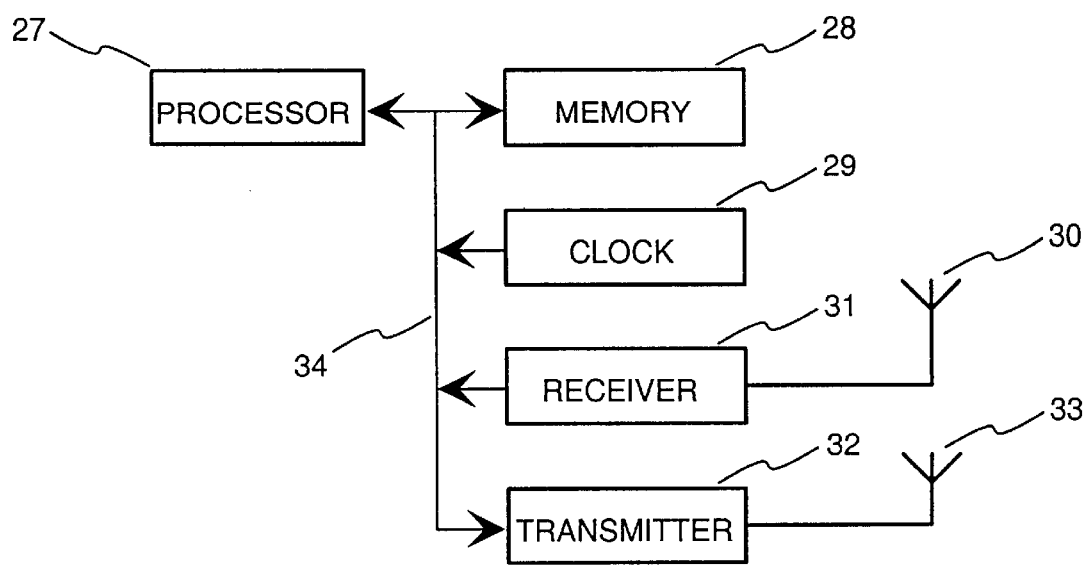
FIG. 7 shows the components of a base station according to the invention in a block diagram.

FIG. 7 shows components of a base station according to the invention that are essential for the invention as a block diagram. The base station comprises a processor 27 for performing the locating routines, such as the calculation formulas of the impulse response, a memory 28 for saving the locating routines and measurement results, such as the values of the impulse responses, a clock 29 for determining the time of arrival of the first signal bursts to be sent from the mobile station to the base station, an ordinary antenna and/or a direction finding antenna 30 for transforming the first signal bursts into electric form and alternatively also for determining the direction of arrival, a receiver 31 for receiving the first signal bursts from the direction finding antenna and a transmitter 32 and an antenna 33 for transmitting second signal bursts from the base station to the mobile station. When the locating method based on time of arrival is used, only an ordinary receiving antenna 30 is needed. When the locating method based on direction finding is used, a direction finding antenna 30 is needed for determining the direction of the received transmission. When the methods are combined, both antennas 30 are possibly needed. The different units of the base station are connected via the connection bus 34. For the sake of clarity, devices that are used for connecting to the signalling channels of the location service centre and that connect the base station preferably by wire to the service centre, have been omitted from the figure.

Figure 8:
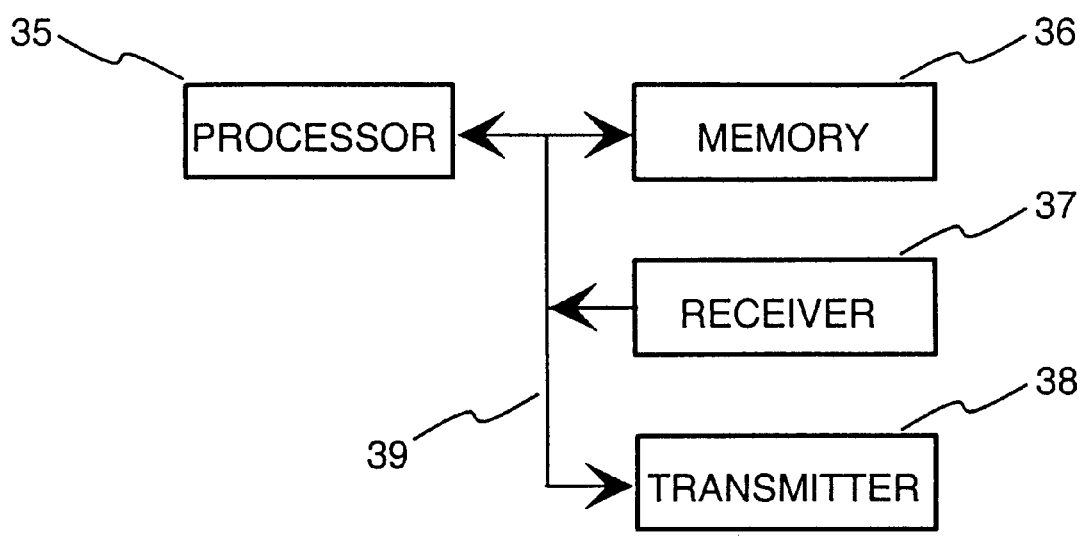
FIG. 8 shows the components of a location service centre according to the invention in a block diagram.

FIG. 8 shows components of a location service centre (LSC) according to the invention as a block diagram. In practice, the location service centre is a computer, which at least performs the calculation routines, maintains data bases, such as the coordinates of base stations, starts the locating process and gives location information to applications. The service centre comprises a processor 35 for locating the mobile station by means of the information received from the base stations, a memory 36 for saving the location determination routines, such as calculation formulas, and the measurement results, such as the calculated time differences of the signal bursts, a receiver 37 for receiving measurement data from the base stations, and a transmitter 38 for requesting measurement data from the base stations. The receiver 37 and the transmitter 38 are in this case preferably devices used for switching the signalling channels, which devices connect the service centre preferably by wire to the base stations and possibly also to the mobile stations. The different units of the service centre are switched to one another via a connection bus 39.

Locating in a manner according to the invention is examined by way of example. The location process is started on the initiative of the mobile station user or the mobile station network. The user selects an operation that starts the location from the menu of the mobile station, or a request to start the location is sent from the mobile station network. On the basis of an emergency call, e.g., the location is started automatically. When the location is started, the mobile station receives as normally the timing of the neighbouring base stations in synchronization bursts, and normal neighbouring cell measurements are performed by the mobile station.

In the location access channel, the first signal burst is sent 6 from the mobile station to one or more base stations. The mobile station and the base stations do not need to be synchronized to one another. However, when required, the transmission from the mobile station is performed in a manner required by the frame structure of the receiving base station, which is important particularly in a locating method based on transition time. The first signal burst contains the mobile station identification 14, such as the international mobile subscriber identification, which connects the signal logically with a certain mobile station. One prior art random access burst has eight bits, three of which are allocated to the access cause and five to the random separator which identifies different mobile stations. The identification according to the invention is preferably also eight bits long. Many base stations share the first signal burst of the same channel or different channels are used for different base stations. If different channels are used, the first signal burst is sent separately to each base station participating in the location process. Different locating signals can be sent if many different location access channels are used.

When needed, the local channel configuration is notified to the mobile station from the serving cell. The base stations send 8 the identification code contained by the signal burst, their own identification code and the measurement results related to the location to the location service centre. In the service centre, the information received from various base stations are combined 9 and the location of the mobile station is calculated.

According to the invention, particularly when based on the angle of arrival of the radio transmission, there must be at least two of the base stations that receive the radio transmission. These base stations 1a, 2a, 3a have direction finding antennas, by which the identification 14 of the mobile station is received and the direction of arrival 1aa, 2aa, 3aa is determined 7. This information is sent 8 to the location service centre 4a, in which, by processing the information received and the location coordinates of the base stations 1a, 2a, 3a, the location of the mobile station 5 is calculated in a manner known per se. The mobile station 5 is situated at the intersection of the directions 1aa, 2aa, 3aa measured by antennas. The location is found with two directions 1aa, 2aa, and more directions make it more accurate.

According to the invention, particularly when based on the time difference of arrival observed in the reception of the radio transmission, all the base stations 1b, 2b, 3b participating in the location process can share the same signal burst of the same location access channel. In this case, using the Code Division Multiple Access (CDMA) provides an advantage, because by it the collisions of the first signal bursts sent 6 by different mobile stations 5 are reduced. The identification 14 of the mobile station 5 is received at the base stations 1b, 2b, 3b, like in the case of location determination based on the angle of arrival as described above, and the exact time of arrival 7 of the first signal burst. This information is sent 8 to the location service centre 4b, where the data are processed and the location of the mobile station 5 is calculated 9 in a manner known per se. Processing the observed time differences provides the hyperbolas 1–3bb, 2–3bb, passing between the base stations 1b, 2b, 3b, at the intersection of which the mobile station 5 is located. After this, the base station 1b, 2b, 3b sends the mobile station 5 acknowledgement of the location determination as above.

According to the invention, particularly when based on the transition time of the radio transmission, the time of arrival of the first signal burst sent from the mobile station 5 is measured 7 at the base station 1c, 2c, 3c, the identification 14 of the mobile station 5 is read and this information is sent 8 to the location service centre 4c for calculating 9 the location. The arrival times are used to determine the location circles 1cc, 2cc, 3cc around the base stations 1c, 2c, 3c. The mobile station 5 is situated at the intersection of these circles 1cc, 2cc, 3cc or some other point which is an optimum location estimate. For example, it can happen that the circles do not intersect at the same point, whereby one possibility is to select as the location estimate of the mobile station the point from which the sum of the distances to different circles is the smallest.

When the location determination is started, the first location signal bursts are sent 6 from the mobile station. When required, the first bursts can also be sent 6 according to a certain predetermined sequencing or randomly. In the mobile station it is not necessary to wait for the possible acknowledgements 11 of the first bursts before sending the next first burst. For example, the first burst is sent 6 from the mobile station to many different base stations and acknowledgements are waited for between transmissions.

In common for all the methods presented above, after the location determination, the base station sends 11 to the mobile station in the location receipt channel the second acknowledgement burst, if this has been implemented. By this it is ensured that all the first bursts have been received and that the location has been determined 9 and no more transmissions are needed. The acknowledgement 11 can also be sent by each base station, based on the reception 7 of the first burst at the base station.

By combining the methods based on the angle of arrival and the time difference of the radio transmission, it is possible to make the locating more accurate. Then both the angle of arrival and the timing advance are determined from the same signal simultaneously.

Due to capacity, mobile stations generally share the location access channels between themselves. One access channel is preferably dedicated for one base station so that many mobile stations transmit to the uplink direction in the same channel, or the same access channel is divided between many base stations, e.g. for reasons of capacity, whereby the first signal burst must include the identification of the receiving base station. The transmissions of different mobile stations can collide, which causes loss of transmission, whereby all the base stations do not receive a location signal. When Code Division Multiple Access (CDMA) is used, there is not a significant amount of collisions or no collisions at all, whereby many mobile stations can transmit the first signal burst in the same channel.

The location receipt channel is used for sending notification from the base station to the mobile station of a successful receipt of the first burst. Preferably, many base stations notify of the receipt at different times so that the transmissions do not collide temporally in the same channel. In the mobile station, it is concluded from the receipts whether a sufficient number of base stations has successfully received the first burst. From the receipts it is also concluded whether a collision has taken place and a decision of a retransmission of the first burst is taken. In cases of collision, the methods that have to be used are random access methods, such as the Aloha method, whereby there is a random waiting time in the mobile station before retransmission, in order to reduce the likelihood of a new collision in the same channel with the same transmitter. The Code Division Multiple Access (CDMA) can also be used in this channel. It is possible to send acknowledgement to the mobile station to indicate that the total procedure of location determination has succeeded.

The locating method according to the invention is particularly useful in connection with emergency calls, because the method makes it considerably faster and easier to locate the caller who needs help than the present methods. With the prior art methods, the mobile station is used to make a call to the mobile station network, where the emergency call is detected, the information is sent to the location service centre, which further sends commands to the base stations. When the method according to the invention is used most preferably, the first bursts are immediately sent from the mobile station to the mobile station network, where these signals are received and transferred to the location service centre, where the location is determined immediately. Possible collisions in the location channels naturally slow down the location determination a little, but this can be solved by dedicating one location access channel entirely for emergency calls.

In the present GSM network, the random access bursts have reserve values by which the new type of burst is determined. In the case of the emergency call, for example, the mobile station sends the first bursts formed like this to the neighbouring base stations, in which these new bursts are received. The bursts contain the random temporary identification created by the mobile station for its recognition. Later the mobile station must report its real identity, such as TMSI or IMSI, and the temporary identification used by it to the location service centre, so that the correlation between them is obtzined. The base stations measure the first bursts, such as random access bursts, but do not start to establish a connection to the mobile station but only report the measurement results to the location service centre. Each measurement result is followed by the temporary identification created by the base station, so that the mobile station can be located in the location service centre. Because the number of alternatives for a temporary identification of random access bursts is small, this implementation can only be used in rare cases, such as emergency calls.

The invention can be implemented in the present GSM network or in the future systems, such as the Universal Mobile Telecommunication System (UMTS) in the following manner, for example. A location channel is determined, which channel allows using longer first bursts than the present random access channel. The first burst to be transferred in this location channel preferably contains the mobile station identification, such as the International Mobile Subscriber Identification (IMSI) or the Temporary Mobile Subscriber Identification (TMSI). In the location channel it is also possible to transfer the first bursts more often. The problem of overlapping bursts can partly be solved by using the Code Division Multiple Access (CDMA) with random code. These codes can be selected from a predefined series. Due to this, when several mobile stations send bursts immediately, the base station can decode all of them.

The invention is not limited to the above embodiments only, but many modifications are possible without departing from the scope defined by the attached claims.

What is claimed is:

1. A method for locating a mobile station by means of radio signals between the mobile station and a mobile station network, characterized in that two separate location channels are formed between the mobile station and the mobile station network in addition to other channels, to which location channel radio communications only related to location determination of the mobile station is concentrated; and wherein the method for locating the mobile station comprises using less than three base stations within the mobile station network.

2. A method according to claim 1, characterized in that two location channels are formed, the first of which is used for radio communications from the mobile station to the network and the second for radio communications from the network to the mobile station.

3. A method according to claim 1, characterized in that a burst is sent (6a, 6b) in the first or second location channel, and properties, such as time of arrival and/or angle of arrival of the burst are measured (7a, 7b) for the location determination (9a, 9b) when the burst is received.

4. A method according to claim 3, characterized in that a measurement (7a, 7b) of differences in the times of arrival of the bursts is performed from an impulse response.

5. A method according to claim 3, characterized in that the burst contains a mobile station identification (14).

6. A method according to claim 5, characterized in that the identification (14) is an International Mobile Subscriber Identification (IMSI).

7. A method according to claim 1, characterized in that the location channels are used in a locating method based on an angle of arrival of a radio transmission.

8. A method according to claim 1, characterized in that the location channels are used in a locating method based on differences in times of arrival of a radio transmission.

9. A method according to claim 1, characterized in that the location channels are used in a locating method based on a transition time of a radio transmission.

10. A mobile station, which comprises: a locating device for locating the mobile station by means of radio signals between the mobile station (5) and a mobile station network, characterized in that the locating device comprises:

a processor (21) for performing locating routines, a memory (22) for saving the locating routines and measurement results, and a transmitter (25) for transmitting a first burst; and that said mobile station is arranged to use a first localization channel for requesting location, and a second localization channel for acknowledging location, said first and second localization channels being arranged between the mobile station and mobile station network in addition to other channels, to which location channel radio communications only related to location determination of the mobile station is concentrated.

11. A mobile station according to claim 10, characterized in that the locating device also comprises a receiver for receiving an acknowledgement signal.

12. A mobile station according to claim 11, characterized in that a receiver is used to receive a second burst, and that the locating device also comprises a clock (23) for determining time of arrival of the second burst, and that the locating routines include at least determining a time difference between the bursts.

13. A base station for locating a mobile station (5) by means of radio signals between the mobile station (5) and a mobile station network, characterized in that it comprises a processor (27) for performing locating routines, a memory (28) for saving the locating routines and measurement results, a clock (29) for determining time of arrival of a first burst, an antenna (30) for transforming the first burst into an electric signal, and a receiver (31) for receiving the first burst from the antenna, and that said mobile station is arranged to use a first localization channel for requesting location, and a second localization channel for acknowledging location, said first and second localization channels being arranged between the mobile station and mobile station network in addition to other channels, to which location channel radio communications only related to location determination of the mobile station is concentrated.

14. A base station according to claim 13, characterized in that it also comprises a transmitter (32) and an antenna (33) for transmitting a second burst and that the locating routines include at least determining a time of arrival of a burst.

15. A base station according to claim 13, characterized in that the antenna (30) is a direction finding antenna for determining a direction of arrival of the first burst, and that the locating routines include at least determining the direction of the first burst.

16. An arrangement for locating a mobile station (5) by means of radio signals between a mobile station (5) and the mobile station network, characterized in that it consists of the mobile station (5), which comprises a processor (21) for performing locating routines, a memory (22) for saving the locating routines and measurement results, a transmitter (25) for transmitting a first burst;

and of at least two or three base stations depending on the locating method, which comprise a processor (27) for performing locating routines, a memory (28) for saving the locating routines and measurement results, a clock (29) for determining time of arrival of the first burst, an antenna (30) for transforming the first burst into an electric signal, and a receiver (31) for receiving the first burst from the antenna; and that said mobile station is arranged to use a first localization channel for requesting location, and a second localization channel for acknowledging location, said first and second localization channels being arranged between the mobile station and mobile station network in addition to other channels, to which location channel radio communications only related to location determination of the mobile station is concentrated.

17. An arrangement according to claim 16, characterized in that the mobile station also comprises a receiver (24) for receiving an acknowledgement signal.

18. An arrangement according to claim 17, characterized in that the receiver (24) of the mobile station is used to receive a second burst, and that the mobile station also comprises a clock (23) for determining a time of arrival of the second burst, and that the locating routines include at least determining a time difference between the bursts and that the base station also comprises a transmitter (32) and an antenna (33) for transmitting the second burst.

19. A location service centre for locating a mobile station (5) by means of radio signals between the mobile station (5) and a mobile station network, characterized in that it comprises a processor, a memory, a receiver, and a transmitter, wherein the processor is arranged for performing locating routines, which include at least determining location of the mobile station by means of burst measurement results received from base stations, the memory is arranged for saving the locating routines and measurement results, the receiver is arranged for receiving the measurement results from the base stations in a signalling channel, and the transmitter is arranged for sending commands to the base stations in the signaling channel, and locating functions are performed in a way that at least one additional channel only for location information is formed, in addition to radio channels used in ordinary communication.

20. A method for locating a mobile station by means of radio signals between the mobile station and a mobile station network, the method comprising the steps of:

forming at least one additional channel between the mobile station and the mobile station network in addition to radio channels used in ordinary communications between the mobile station land the mobile station network;

concentrating only location information into the at least one additional channel; and transferring the concentrated location information between the mobile station and the mobile station network.

21. A method for locating a mobile station by means of radio signals between a mobile station and a mobile station network, the method comprising the steps of:

forming two additional channels between the mobile station and the mobile station network, in addition to radio channels used in ordinary communications between the mobile station and the mobile station network, wherein the two additional channels comprise:

a first channel; and a second channel;

transferring only location information concentrated in the first channel from the mobile station to the mobile station network; and transferring only location information concentrated in the second channel from the mobile station network to the mobile station, wherein the second channel further comprise a location receipt channel.

* * * * *